July 17, 1934.  G. F. COUCH  1,966,923
JOURNAL BOX
Filed Nov. 11, 1929  2 Sheets-Sheet 1

Inventor
Glenn F. Couch
By
Attorney

July 17, 1934.  G. F. COUCH  1,966,923
JOURNAL BOX
Filed Nov. 11, 1929   2 Sheets-Sheet 2
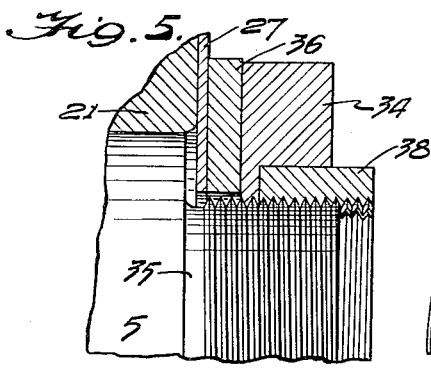
Fig. 5.
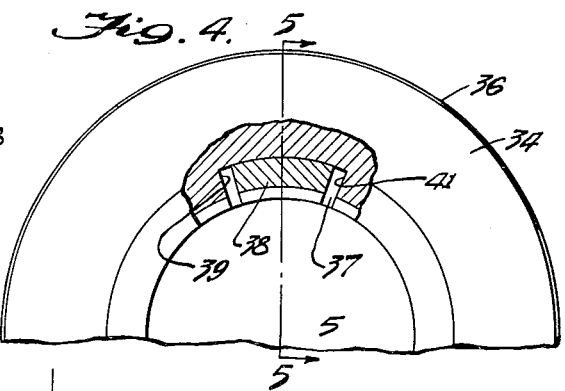
Fig. 4.
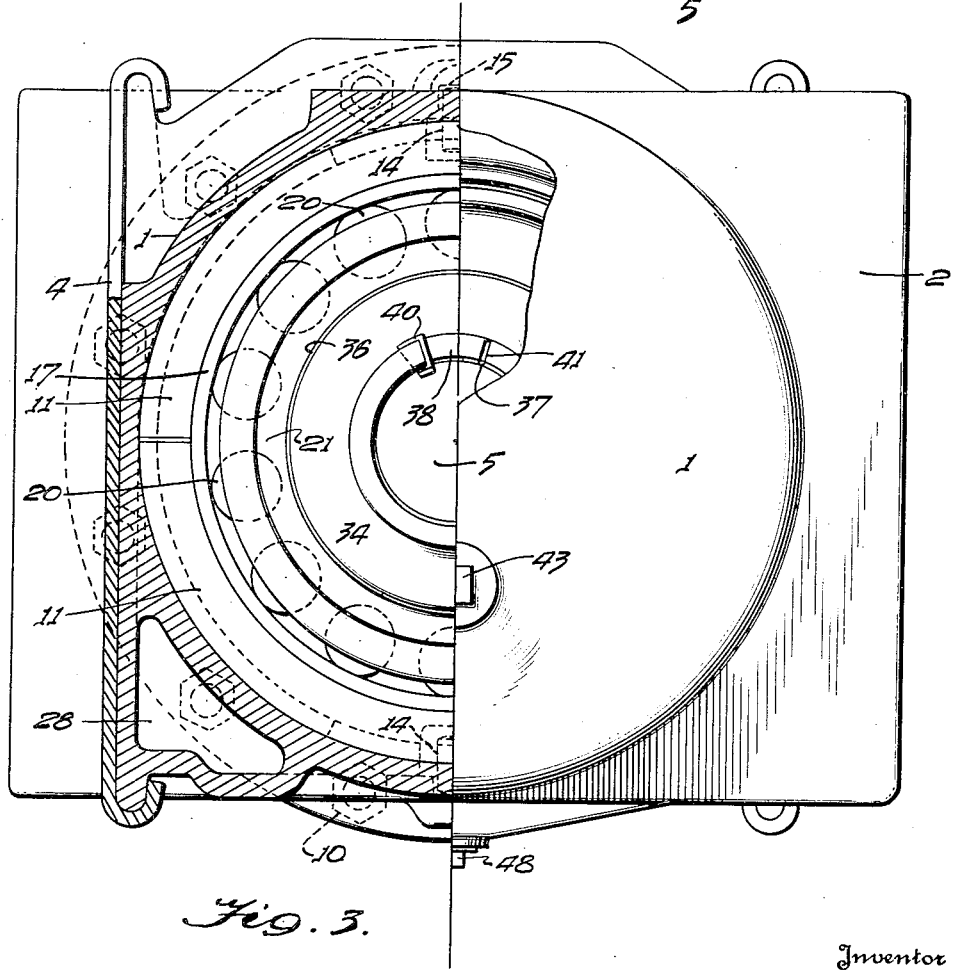
Fig. 3.
Inventor
Glenn F. Couch
By
Attorney Patented July 17, 1934

1,966,923

UNITED STATES PATENT OFFICE 1,966,923

JOURNAL BOX

Glenn F. Couch, Rochester, N. Y., assignor to The Symington Company, New York, N. Y., a corporation of Maryland Application November 11, 1929, Serial No. 406,424

11 Claims. (Cl. 308—180)

This invention relates to journal boxes and more particularly to such having roller bearings and mounted for equalization with respect to associated journals.

The principal object of my invention, generally considered, is to construct journal boxes with roller bearings, preferably of the conical type, whereby the main load and axial thrust are taken care of, the outer element of the roller bearing assembly being adapted to equalize with respect to the box to obviate non-uniform load application on the rollers.

Another object of my invention is to provide a roller bearing journal box adapted to receive an outer concave equalizing ring formed in two or more sections to facilitate assembly and each section carrying an extension against which the rear cover of the box bears to hold it in place, means being provided to prevent said ring from turning, said means preferably comprising floating dowels riding in grooves in the main housing with the other ends received in said ring.

A further object of my invention is to provide a roller bearing journal box assembly in which the box or main housing thereof may be readily withdrawn or removed for inspection of the rollers.

A still further object of my invention is to provide a roller bearing journal box assembly and a perforated trough-like oil throwing ring mounted on the journal adjacent the aperture in the cover through which it passes for the purpose of sealing said cover against loss of oil therethrough.

An additional object of my invention is to provide a roller bearing journal box in which an oil impeller is mounted adjacent the end of the journal with its outer periphery preferably formed as a trough with apertures and impeller blades or vanes adjacent thereto for throwing oil centrifugally through the rollers, the box being provided with return passages connecting the front and rear ends thereof for the return of the oil.

Another object of my invention is to provide a journal box receiving a journal and roller bearing assembly, special locking means being provided for holding the inner elements of the assembly in place on the associated journal.

Other objects and advantages of the invention relating to the particular arrangement and construction of the various parts will become apparent as the description proceeds.

Referring to the drawings illustrating my invention, the scope whereof is defined by the appended claims.

Figure 3 is a partial end elevation and partial transverse sectional view of the journal box assembly shown in Figures 1 and 2.

Figure 4 is a partial end elevation and partial sectional view of a fragmentary portion of the journal spanner nut and locking device therefor.

Figure 5 is a fragmentary sectional view on the line 5—5 of Figure 4, looking in the direction of the arrows.

Figure 2:
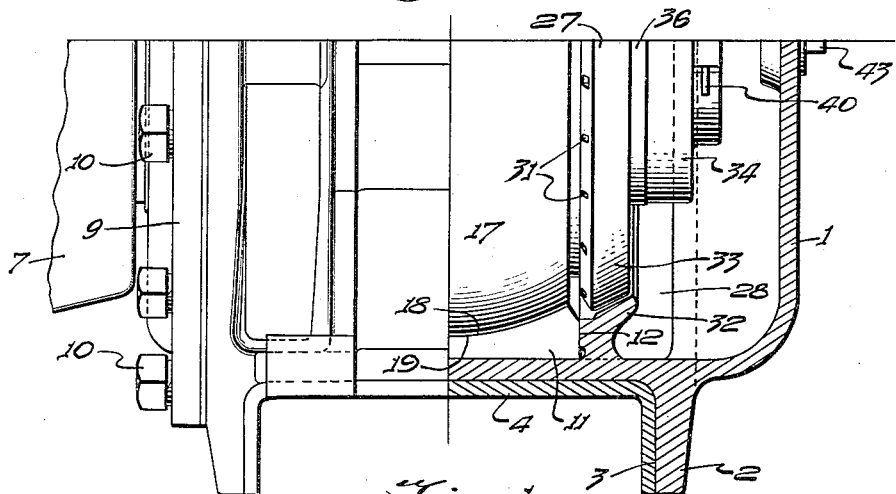
Figure 2 is a plan of the box shown in Figure 1, a portion thereof being broken away to show the enclosed roller bearing assembly.
Figure 1:
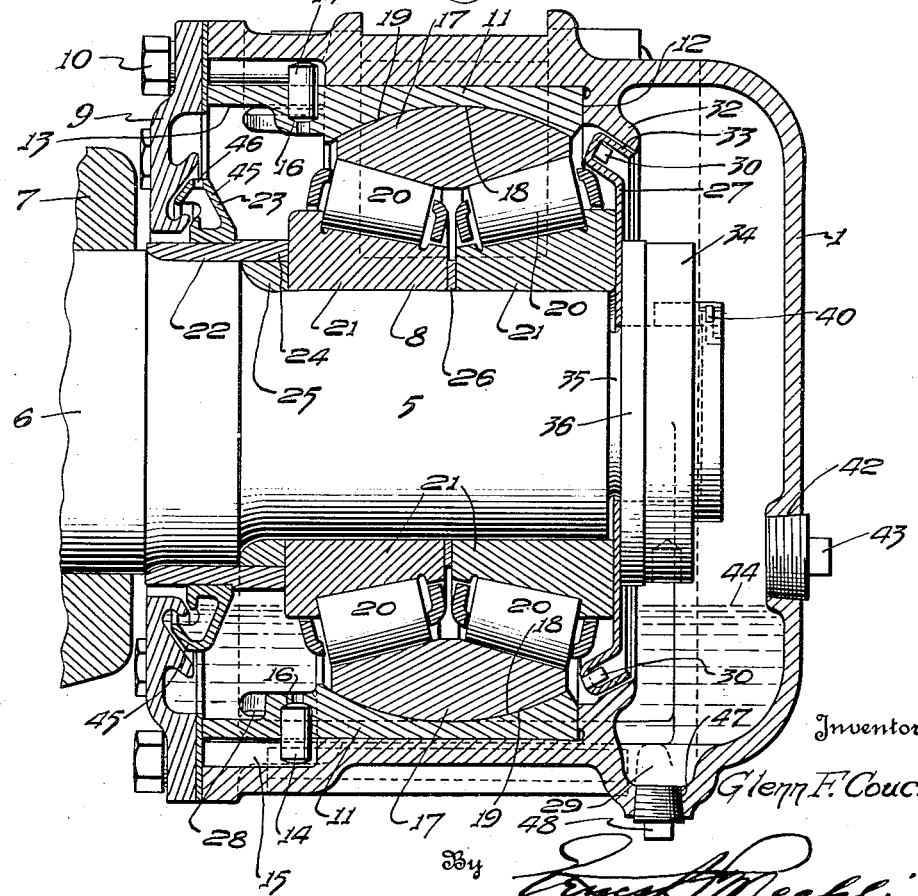
Figure 1 is a transverse sectional view of a journal box and roller bearing assembly, the associated journal being shown in side elevation.

Referring to the drawings in detail, like parts being designated by like reference characters, I have shown a journal box 1 which, in the present embodiment, has outstanding flanges 2 providing channels 3 on either side of said box, which channels preferably have wear plates 4 mounted therein and adapted to engage the legs or depending portions of an associated railway truck pedestal (not shown). Received in the box is a journal 5 extending from an axle 6 on which may be mounted wheels 7, only a fragmentary portion of one of which is shown. Although only one end of the axle 6 is shown, it will be understood that the other end is desirably of similar construction and associated with a similar journal box.

Disposed between the journal 5 and the box 1 is the roller bearing assembly 8. For closing the annular space between the journal 5 and box 1, a rear journal box cover 9 is desirably provided and connected to the box by means of tap bolts 10 with a gasket preferably disposed between the cover and box for making the box oil tight. In order to permit equalization between the box 1 and roller bearing assembly therein with the associated journal, an outer equalizing ring 11 is provided, the outer surface of which fits the inner surface of the box with its outer edge preferably engaging a shouldered portion 12 on the box and its inner edge or extension 13 thereof being engaged by the inner wall 9, or the associated gasket, to hold it securely in place. In order to facilitate assembly of the equalizing ring 11 with respect to the roller bearing assembly, said ring is formed in more than one and preferably two pieces. In order to prevent turning of the ring, floating dowels 14 are desirably provided riding in grooves 15 in the box or main housing 1 with their inner ends received in pockets 16 in the ring 11.

The inner element 17 of the equalizing arrangement forms the outer element of the roller bearing assembly and is preferably provided with a convex spherical outer surface 18 fitting the concave spherical portion 19 of the equalizing ring 11, so that a limited amount of equalization is permitted therebetween. The rollers 20, which in the present embodiment are conical or tapered, are preferably disposed between the pair of inner bushings or bearing cones 21 mounted directly on the journal 5 and the equalizing element 17, which has an inner double frustro-conical bearing surface engaged by the rollers 20. Before applying the bushings or inner cones 21 to the journal, a bushing or ring 22 is preferably mounted on the axle 6 adjacent the inner portion of the journal 5, said bushing preferably carrying an oil throwing ring 23 securely connected thereto, as by being shrunk thereon. Under the outer edge 24 of the bushing 22 is secured a tightening bushing or ring 25 and both held in place by the bearing cones 21 spaced, if desired, by a spacing ring 26.

Mounted on the journal, preferably adjacent the outer end of the outer bearing cone 21, is an oil impeller 27 preferably pressed from a plate and provided with a crimped edge for forcing oil through the rollers to the rear of the box from which it returns through passages 28, sediment being collected in a sump 29. The impeller preferably has its edge or periphery formed as a trough diagonally disposed or with the side walls thereof concentric with the spherical equalizing surfaces 18 and 19. The bottom wall of the trough preferably has tabs 30 bent into the trough therefrom leaving apertures 31 for the passage of oil and providing impeller blades for stirring up the oil and forcing it centrifugally to take a path axially of the rollers 21. Cooperating with the impeller is a diagonally disposed flange 32, the inner surface of which lies adjacent to the outer wall 33 of the trough portion of the impeller 27 and is parallel or concentric therewith, so that no interference occurs even when the journal equalizes with respect to the box, and the oil is directed diagonally outward and rearward and prevented from being flung directly outward or radially by the impeller.

In order to hold the roller bearing assembly in place, a round spanner nut 34 is desirably threaded to a reduced portion 35 on the journal 5. A washer 36 is desirably disposed between the nut 34 and the impeller 27, and when tightened, holds the bushings 22 and 25, the bearing cones 21, spacer 26 and the impeller 27 all in place on the journal 5. In order to lock the nut 34 in position, a segmental pocket 37 is desirably cut therein and a segmental portion 38 shorter circumferentially than the segmental pocket 37 is formed and fitted thereinto, being held tight against the wall 39 in any desired manner, as by means of a wedge, when the threads are cut on the nut and segmental portion 38 therein, assuming the threads to be right handed. The nut may then be applied while the segmental insert 38 rests against the wall 39 of the pocket 37, allowing the nut to be readily tightened. To lock the nut, the insert 38 is forced by means of the wedge 40 into position, as shown for example in Figures 3 and 4, causing distortion of the threads and securely locking the nut in place. Should the spanner nut tend to back off, the locking segment 38 will wedge itself toward the opposite wall 41 of the pocket 37, causing a still greater locking action. The locking wedge, after being fitted in place, may have its ends or one end, assuming the outer end is already headed or bent over, distorted or bent over to prevent undesired removal. In order to remove the nut, the locking wedge 40 is first taken out and a wedge driven into the space between the wall 41 and the segmental insert 38 to release pressure on the threads and permit ready removal of the nut.

The journal box is desirably provided with an oil filling hole 42 closed by a plug 43 and the oil level is desirably maintained at or near the lower edge of the filling hole 42, as indicated at 44. In order to provide a seal against loss of oil from the inner or back portion of the box along the journal, the oil thrower ring 23 preferably has a trough shaped portion 45 provided with apertures 46, which portion, when the journal is in motion, serves to collect oil which would have a tendency to escape past the journal and through the back wall of the box, throwing said oil back into the box through the holes 46. Of course, it will be understood that when the journal is not turning, the oil level is preferably below the inner periphery of the inner wall 9 of the box, so that it would not have a tendency to run out until stirred up by movement of the journal. In order not to interfere with free equalization of the journal in the box, the adjacent surfaces of the inner wall 9 of the box and the oil thrower 23 are formed substantially concentric with the curved or spherical surface 18 on the equalizing ring 17. In order to provide for draining the box, for the removal of sediment or the renewal of oil, an aperture 47 is provided below the sump 29 and closed by a plug or other closure means 48.

From the foregoing disclosure, it will be seen that I have devised an improved roller bearing journal box using conical or tapered rollers particularly adapted for railway rolling stock. Free equalization of the journal with respect to the box within the desired limits is provided for. On account of using two sets of roller bearings disposed axially along the journal and inclined in opposite directions, not only is the main load adequately taken care of, but end thrust is taken up. On account of the connection between the outer equalizing ring and the journal box or main housing thereof, said main housing may be easily removed for the inspection of the bearing upon taking out the bolts 10 which secure the inner cover to the box. By providing an impeller of the character described, I secure a free circulation of oil along the rollers, thereby minimizing wear on the parts.

Although I have disclosed a preferred embodiment of my invention, it will be understood that the same is merely illustrative and that modifications may be made without departing from said invention within the scope and spirit of the following claims.

Having now described my invention, I claim:

1. In combination, a journal box, a journal therein, a back cover for said box closing the space between said box and journal, an equalizing ring formed as a plurality of parts and received between and held in place by said box and cover, said equalizing ring presenting an inwardly concave spherical surface, and roller bearing means disposed between said journal and box, the outer element of said bearing means havinging a convex spherical surface fitting, around the periphery, the concave spherical surface of the equalizing ring to permit equalization between said journal and box.

2. In combination, a journal box, a journal therein, a back cover for said box closing the annular opening around said journal, an equalizing ring formed in a plurality of parts and received in said box and held in place by said cover, said equalizing ring presenting an inwardly concave substantially spherical surface, and conical roller bearing means disposed between said journal and box, the outer element of said bearing means having a convex substantially spherical surface fitting the concave surface of the equalizing ring to permit equalization between said journal and box.

3. In combination, a journal box, a journal therein, a cover for said box closing the space around said journal, an equalizing ring formed in two parts and received in said box, said cover engaging the adjacent end of said ring and holding it in place, said ring being prevented from turning by means extending outwardly therefrom and fitting in grooves in said box, said equalizing ring presenting an inwardly concave spherical surface, and roller bearing means disposed between said journal and box, the outer element of said bearing means having a convex spherical surface fitting the concave spherical surface of the equalizing ring to permit equalization between said journal and box.

4. In combination, a journal box, a journal therein, a back cover for closing the space between said journal and box, means connecting said cover and box, an equalizing ring formed in two parts and presenting an inwardly concave spherical surface, said ring being received in said box and carrying an extension against which the cover bears, when in place, that portion of said box overlying said extension being formed with grooves, floating dowels extending from said equalizing ring into said grooves for preventing turning of said ring, and roller bearing means disposed between said journal and box, the outer element of said bearing means having a convex spherical surface fitting the concave spherical surface of the equalizing ring to permit equalization between said journal and box.

5. In combination, a journal box and journal assembly comprising parts with cooperating spherical surfaces permitting equalization of said journal in said box, a cover for closing the space between said journal and box, bearing means between said journal and box, and an oil thrower on said journal positioned close to said cover for preventing leakage along said journal past the cover, said oil thrower being formed with an outer trough-like portion for catching oil and perforations for discharging oil therefrom when the journal is in motion, the adjacent portions of said thrower and cover being concentric with said spherical surfaces to avoid interference with equalization.

6. In combination, a journal box, a journal therein, roller bearing means disposed between said journal and box, and means for causing a circulation of oil through said roller bearing means comprising an impeller formed with a trough shaped portion opening diagonally away from said bearing means, apertured toward said means and provided with blades for throwing the oil centrifugally along the roller bearing means when the journal is in motion, said box being provided with a return passage for said oil.

7 In combination, a journal box, a journal therein, a back cover for said box closing the space around said journal, an equalizing ring received between said box and cover, said ring presenting an inwardly concave spherical surface, bearing means disposed between said journal and box and comprising an outer element having a convex spherical surface fitting the concave surface of the equalizing ring and an inner element mounted on said journal, and a centrifugal oil impeller mounted on said journal beyond the end of said inner element and formed with a diagonally disposed perforated trough-like portion for causing a circulation of oil through said bearing means when the journal is in motion, said trough-like portion having the outer surface thereof arranged substantially concentric with the spherical equalizing surfaces to avoid interfering with equalizing action.

8. In combination, a journal box, a journal therein, a back cover for said box closing the space around said journal, and means for equalizing the journal with respect to said box comprising an equalizing ring formed in two parts and received between said box and cover, the outer surface of said ring fitting the inner surface of said box, the front edge of said ring normally engaging a shoulder on said box, and said cover engaging the rear edge of said ring for holding it tightly in place against said shoulder.

9. In combination, a journal box, a journal therein, a box cover for closing the space around said journal, and equalizing means for said journal comprising a bushing formed in two parts, the outer surface fitting the inner surface of the box, the front edge normally engaging a shoulder on the box, and presenting an inwardly concave spherical surface, said ring carrying a rearward extension, and said cover engaging said extension for holding the ring in place, that portion of the box overlying said extension having grooves, and floating dowels extending from said equalizing ring into said grooves for preventing turning of said ring.

10. In combination, a journal box, a journal therein, means permitting equalization of said journal in said box, a rear cover plate for closing the space between said journal and box, bearing means between said journal and box, and means, positioned close to said cover plate for sealing the space between said journal and plate, comprising an oil thrower on said journal formed with an outer trough-like portion for catching oil, said portion being perforated for discharging oil therefrom when the journal is in motion, the adjacent surfaces of said thrower and plate being spherically concentric to avoid interference with journal equalization.

11. In combination, a journal box, a journal therein, bearing means between said journal and box, and means for circulating lubricant through said bearing means comprising a centrifugal oil impeller mounted adjacent the end of said journal, formed with a diagonally disposed perforated trough-like portion, said box being provided with an inwardly extending diagonally disposed flange exterior of and cooperating with the trough-like portion on the impeller for causing the lubricant to be circulated diagonally toward the rear of the box.

GLENN F. COUCH.